Patented Dec. 15, 1936

2,064,361

UNITED STATES PATENT OFFICE 2,064,361

OPTICAL GLASS COMPOSITION

Murray R. Scott, Rochester, N. Y., assignor to Bausch & Lomb Optical Company, Rochester, N. Y., a corporation of New York No Drawing. Original application March 7, 1932, Serial No. 597,421. Divided and this application March 28, 1935, Serial No. 13,477

2 Claims. (Cl. 106—36.1)

This application is a division of my co-pending application Serial No. 597,421 filed March 7, 1932, Patent No. 2,021,244, November 19, 1935.

This invention relates to improvements in the composition of optical glass. Achromatic, fused, bifocal spectacle lenses have been made by fusing onto a major blank of glass a segment having a higher refractive index than, but substantially the same dispersion as the major blank, as described in U. S. Reissue Patent No. 16,541 issued to T. B. Drescher. In one method of practicing this invention, a segment of barium crown glass, having an index of 1.616 and a dispersion, as expressed by "$\nu$" (Greek letter nu) of 55 is fused onto a major blank having an index of 1.52 and a $\nu$ value of 55. Ordinary optical crown glass has a $\nu$ value of about 58.5 or 59 and in order to reduce this value to 55 it is necessary to substitute some other element such as oxide of lead for a large part of the lime that is usually present in such glass.

Tinted or colored spectacle lenses are often prescribed when it is desired to reduce glare. Such a tinted lens having a brownish pink or flesh color can be made from optical glass containing manganese. When it is desired to produce a fused, achromatic bifocal lens of a brownish pink or flesh color the addition of manganese to the batch produces a glass having a dense pink or amethyst color which is undesirable from a cosmetic viewpoint. I have found, however, that the desired brownish pink or flesh color can be obtained by adding either titanium or cerium to the batch.

One of the objects of my invention is to produce a brownish pink or flesh colored optical glass for use in making achromatic, fused, multifocal lenses. Another object is to provide a special crown optical glass having a brownish pink or flesh color, a refractive index, for the D line, between 1.50 and 1.55 and a dispersion $\nu$ between 58.5 and 51.0.

An example of a batch which will provide a brownish pink or flesh colored optical glass having the desired optical properties has the following composition:

| | Percent |
|---|---|
| Silica | 67.5 |
| Potassium oxide | 13.0 |
| Sodium oxide | 3.0 |
| Calcium oxide | 4.0 |
| Lead oxide | 5.5 |
| Zinc oxide | 1.5 |
| Antimony oxide | 2.0 |
| Arsenous oxide | .5 |
| Manganese dioxide | 2.0 |
| Cerium oxide | 1.0 |
| | 100.0 |

Cerium hydrate or other compounds of cerium or the more pure form of cerium oxide can be used with about the same results.

Darker shades of this colored glass can be obtained by adding more manganese dioxide and cerium and removing enough other ingredients such as lime and lead to give the desired optical properties. The amount of cerium increases with the manganese content. In a glass of this type the oxide of lead has been substituted for a large part of the lime of the usual crown glass in order to lower the $\nu$ value. The amount of manganese added to the batch is approximate as it is well known that the amount of color produced by this material is dependent upon melting conditions. The antimony oxide is used primarily as a fining agent to aid in the elimination of seeds in the glass but it also aids in raising the index and lowering the $\nu$ value as well as having somewhat the same effect on the color as the cerium.

I claim as my invention:

1. A colored optical glass having a refractive index between 1.50 and 1.55 and a dispersion, as expressed by $\nu$, between 51.0 and 58.5 and comprising compounds of lead, manganese and cerium.

2. A colored optical glass having a refractive index between 1.50 and 1.55 and a dispersion, as expressed by $\nu$, between 51.0 and 58.5 and comprising a lead compound, over 1% of manganese compound and less than 2% of cerium compound.

MURRAY R. SCOTT.